United States Patent [19]

Asai

[11] 4,437,321
[45] Mar. 20, 1984

[54] ABSORPTION COOLING AND HEATING SYSTEM

[75] Inventor: Setsuro Asai, Shimizu, Japan

[73] Assignee: Hitachi, Ltd., Tokyo, Japan

[21] Appl. No.: 416,042

[22] Filed: Sep. 8, 1982

[30] Foreign Application Priority Data

Sep. 11, 1981 [JP] Japan .............................. 56-142309

[51] Int. Cl.³ .............................................. F25B 13/00
[52] U.S. Cl. ...................................... 62/324.2; 62/476
[58] Field of Search ...................... 62/141, 324.2, 476, 62/485, 495

[56] References Cited

U.S. PATENT DOCUMENTS

| | | | |
|---|---|---|---|
| 3,527,061 | 9/1970 | Kruggel et al. | 62/142 |
| 3,638,452 | 2/1972 | Kruggel | 62/485 |
| 4,207,751 | 6/1980 | Kampfenkel et al. | 62/141 |

*Primary Examiner*—Lloyd L. King
*Attorney, Agent, or Firm*—Antonelli, Terry & Wands

[57] ABSTRACT

A heat accumulator and heat pipes are connected to an absorption cooling and heating system including a generator, two outdoor heat exchangers, an expansion valve for cooling, an expansion valve for heating, an expansion valve for defrosting, two indoor heat exchangers, a pressure reducing valve for solutions, a solution pump and a plurality of valves for switching between channels, wherein the first of the two indoor heat exchangers functions as a condenser, the two indoor heat exchangers function as evaporators and the second outdoor heat exchanger functions as an absorber in a cooling mode, the first indoor heat exchanger functions as a condenser, the two indoor heat exchangers function as evaporators and the second indoor heat exchanger functions as an absorber in a heating mode, and the two indoor heat exchangers function as condensers and the second indoor heat exchanger functions as an absorber in a defrosting mode. The heat accumulator is located downstream of the expansion valve for defrosting and serving as a channel for a refrigerant. The heat-pipes have a heat releasing end inserted in the heat accumulator and a heat source end inserted in a waste heat flue of a burner for heating the generator. Thus in a defrosting mode, a refrigerant flowing from having its pressure reduced by the expansion valve absorbs the waste heat of the burner for heating the generator through the heat accumulator, to be heated thereby and vaporize.

8 Claims, 3 Drawing Figures

ABSORPTION COOLING AND HEATING SYSTEM

BACKGROUND OF THE INVENTION

1. Field Of the Invention

This invention relates to an absorption cooling and heating system including an absorption heat pump refrigerating apparatus using air as a heat source having heat pipe means incorporated therein.

2. Description of the Prior Art

In absorption type refrigerating apparatus utilizing thermal energy as a source of energy, a gas fired absorption type cooling and heating system has come to attract attention. Also, an apparatus is known which uses air cooled heat exchangers using air (atmospheric air) as a heat source of the heat exchangers.

There are several combinations of a refrigerant and an absorbant available for use in absorption type refrigerating apparatus, and most common combinations used for practical purposes include water - lithium bromide, ammonia - water, and $CHClF_2$ fluoro carbon (freon) - $CH_3O(CH_2CH_2O)_4CH_3$ or tetraethyleneglycol dimethlether.

The aforesaid gas fired absorption cooling and heating system comprises as the basic equipment of a refrigerating apparatus a generator, a condenser, expansion valves, an evaporator, an absorber and a solution pump and uses a refrigerant gas of high temperature heated and separated at the generator as a source of heat for heating and defrosting and a latent heat generated at the evaporator as a heat source for cooling.

The inventions have been developed prior to the present invention include U.S. Pat. No. 3,638,452, U.S. Pat. No. 4,207,751 and Japanese Patent Application Laid-Open No. 53052/78, for example. These documents of the prior art will be discussed.

In U.S. Pat. No. 3,527,061, the system is switched between a cooling mode and a heating mode by switching between a cold water circuit and a hot water circuit without effecting on-off control of a refrigerant circuit. A refrigerant of high temperature separated at the generator is condensed into a refrigerant in a liquid state at the condenser which is expanded to have its pressure reduced at a thermostatic expansion valve before being fed into the evaporator to cool water flowing therethrough. In a cooling mode, the water thus cooled is fed into a heat exchanger inside a space to be cooled through a water channel on-off valve so that heat exchange will take place between the cooled water and indoor air forcedly blown against the heat exchanger by a blower to thereby cool the indoor air. In a heating mode, hot water flowing through the condenser and the absorber is fed through the water channel on-off valve into the heat exchanger located in the space to be heated, to heat the indoor air by the hot water. In the heating mode, frost formed on the outdoor heat exchanger due to prolonged operation is removed by temporarily switching the water channel to suit the cooling operation.

In U.S. Pat. No. 3,638,452, on-off control of the refrigerant circuit and the water channel is not effected and the apparatus is operated only to perform a cooling operation by using cold water. A refrigerant of high temperature separated at the generator is condensed at the condenser into a refrigerant in a liquid state which is expanded and has its pressure reduced by the expansion valve before being fed into the evaporator to cool water therein for use as a cooling heat source.

In U.S. Pat. No. 4,207,751, on-off control of the refrigerant circuit is not effected and a refrigerant is fed, in a cooling mode, directly into a heat exchanger installed on a duct communicating with a space to be cooled, so as to directly cool the air. In a heating mode, heat is recovered from the condenser and absorber through a hot water circuit, so that the heat can serve as a heating heat source.

Japanese Patent Application Laid-Open No. 53052/78 discloses a heat pump type cooling and heating system using a water heat source in which cold water and hot water are obtained by effecting on-off control of the refrigerant circuit to perform cooling and heating operations. To perform a cooling operation, water cooled at the evaporator is used as a cooling heat source; to perform a heating operation, the evaporator is made to function as an absorber and the absorber is made to function as an evaporator by partly controlling the refrigerant circuit.

From the foregoing description, it will be appreciated that cooling and heating systems of the prior art using a conventional absorption type refrigerating apparatus include a system which obtains cold water and hot water serving as cooling and heating heat sources without effecting on-off control of the refrigerant circuit, a system which performs a cooling operation as a direct expansion system in which heat exchange takes place between a refrigerant and air through a heat exchanger and a heating operation by using as a heating heat source hot water obtained by utilizing both heat of absorption and heat of condensation, and a system which effects on-off control of the refrigerant circuit to obtain cold water and hot water for use as cooling and heating heat sources.

Generally, the use of an air-cooled type heat exchanger makes it necessary to effect defrosting to remove frost formed during heating operations. To effect defrosting, cooling and heating systems may be temporarily switched from the heating operation to a cooling operation, as is the case with the system described in U.S. Pat. No. 3,527,061 referred to hereinabove. However, this process has a disadvantage in that cold water is fed into the indoor heat exchanger during defrosting operation and the indoor air is cooled so that cold air is blown into the space and causes discomfor to those who are in the space. To mitigate this unpleasantness felt by the occupants of the space by reducing the volume of cold air blown into the space, the revolutional velocity of the blower may be reduced or operation of the blower may be suspended or an auxiliary heat source, such an electric heater, may be actuated to heat the air that is blown into the space. Such process is used in air cooling type heat pump cooling and heating systems using a compressor, for example. In some other systems of the compression type, a plurality of heat exchangers are used and some of them are switched to perform defrosting while other heat exchangers still perform a heating operation. However, all the remedies taken for mitigating the discomfort suffered by the occupants of the space make the system large in size and do not suit cooling and heating systems of small capacity. Meanwhile systems of the water heat source and water cooled type are not favored because restrictions on utilization of water resources are becoming stricter nowadays and apparatus utilizing water tend to be frowned upon.

Under these circumstances, creation of an absorption type cooling and heating system of the air heat source and air cooled type that is capable of conserving energy has been in demand.

SUMMARY OF THE INVENTION

(1) Objects of the Invention

An object of this invention is to provide an absorption type cooling and heating system using air as a heat source capable of effecting space heating with improved heating capabilities while performing defrosting of outdoor heat exchangers.

Another object is to provide an absorption type cooling and heating system capable of effectively using waste heat possessed by exhaust gases following heating of the generator.

(2) Statement of the Invention

The applicant has filed, prior to the present application, U.S. Ser. No. 344,803, now U.S. Pat. No. 4,411,140, in which is disclosed an invention comprising an outdoor heat exchanger and two indoor heat exchangers, the outdoor heat exchanger functioning as a condenser and an absorber and the two indoor heat exchangers functioning as evaporations in a cooling mode and one of the indoor heat exchangers functioning as a condenser and the other indoor heat exchanger functioning as an absorber in a heating mode. To avoid a reduction in heating capabilities that might otherwise be caused by frost formation on the outdoor heat exchanger, the outdoor heat exchanger is made to function as a condenser and one of the indoor heat exchangers is made to function as an absorber when defrosting is performed, to enable blowing of warmed air into the space to be continued. Thus the invention is characterized by performing heating even when defrosting is being performed.

The invention described hereinabove suffers the disadvantage that since heating and defrosting are performed merely by thermal input to the generator while the system is in a defrosting mode, the amount of heat used for defrosting is large and the heating capabilities of the absorber during a defrosting operation are reduced.

The present invention has been developed for the purse of obviating the aforesaid disadvantage of the invention disclosed in U.S. Ser. No. 344,803, now U.S. Pat. No. 4,411,140.

To accomplish the aforesaid objects, there is provided an absorption type cooling and heating system comprising a generator, two outdoor heat exchangers, an expansion valve for cooling, an expansion valve for heating, an expansion valve for defrosting, two indoor heat exchangers, a pressure reducing valve for the solution, a solution pump and a plurality of valves for effecting switching of channels. In a cooling mode, the first outdoor heat exchanger functions as a condenser, the two indoor heat exchangers function as evaporators and the second outdoor heat exchanger functions as an absorber, and in a heating mode, the first heat exchanger functions as a condenser, the two outdoor heat exchangers function as evaporators and the second indoor heat exchanger function as an absorber. In a defrosting mode, the two outdoor heat exchangers function as condensers, and the second indoor heat exchanger functions as an absorber while a heat accumulator functioning as a channel for a refrigerant is mounted on the downstream side of the expansion valve for defrosting and has inserted therein a heat releasing end of heat pipes having at the other end thereof a heat source inserted in a waste heat flue for a burner for the generator. In a defrosting mode, a refrigerant changed to a liquid state by the condenser and having its pressure reduced by the expansion valve is heated as it absorbs the waste heat of the burner for the generator through the heat pipes and the heat accumulator, so that the heated refrigerant is evaporated and changes to a refrigerant in a gaseous state which is mixed with a dilute solution.

An outstanding characteristic of the absorption type cooling and heating system of the aforesaid construction is that it is possible to continue heating while performing a defrosting operation in which defrosting is effected efficiently.

In a heating mode, the first of the two indoor heat exchangers function as a condenser which releases heat into the air in circulation to heat same for heating purposes, and the second indoor heat exchanger functions as an absorber to release heat of absorption into the air in circulation to heat same so that the heated air will serve heating purposes together with the air heated by the action of the condenser.

As the heating operation is continuously performed, frost is formed on the two outdoor heat exchangers functioning as evaporators. Heating capabilities of the heating system drop if the frost formed on the heat exchangers is large in amount, so that the system is switched to a defrosting mode.

In a defrosting mode, the two outdoor heat exchangers function as condensers to which a refrigerant of high temperature in a gaseous state is caused to flow to effect defrosting. The heat exchange that occurs causes the refrigerant to release heat and change to a condensate which is passed through the expansion valve to have its pressure reduced before flowing into the heat accumulator. The refrigerant heated in the heat accumulator is evaporated into a gaseous state of high temperature, and the refrigerant gas flows out of the heat accumulator to a point of confluence with a dilute solution from the generator.

Heating of the refrigerant at the heat accumulator is effected by the heat released from the heat releasing end of the heat-pipes. The other end of the heat-pipes is arranged in the waste heat flue of the burner for heating the generator, so that the refrigerant, such as a fluoro carbon refrigerant, sealed in the heat-pipe is heated and the heated refrigerant flows through the heat-pipes and releases heat at the heat releasing end of the heat-pipes, to be cooled and condensed into a liquid state to return to the heat source end of the heat pipe where the refrigerant is heated again to vaporize. The foresaid process takes place repeatedly. The waste heat in the flue produced by heating the generator is recovered through the heat-pipes by the refrigerant in the heat accumulator to heat the refrigerant. Meanwhile the dilute solution from which the refrigerant has been separated in vaporization or a solution containing no refrigerant is at high temperature. The dilute solution of high temperature is drawn off the generator and has its pressure reduced by a pressure reducing valve before reaching the point of confluence where it is mixed with the refrigerant. The mixture of the fluids is fed into the second indoor heat exchanger functioning as an absorber in which heat of absorption and heat of solution are released into the air in circulation to cool the solution and the refrigerant.

The refrigerant is absorbed into the solution which is changed to a concentrated solution which is fed under pressure by the solution pump into the generator. The series of operations described hereinabove is repeated continuously. By the aforesaid absorbing and dissolving actions, the indoor air is heated as it absorbs heat from the absorber to accomplish the object of effecting space heating.

In a system of the type in which the heat source end of the heat-pipes and the heat releasing end thereof in the heat accumulator are formed with a multiplicity of fins arranged in side-by-side relation, the heat transfer area of the heat-pipes is greatly increased to enable the transfer of heat to be vigorously effected at the heat source end and the heat releasing end of the heat pipes.

By constructing the system in such a manner that heat accumulating balls are sealed in the heat accumulator and allowed to float in a refrigerant flowing through the heat accumulator, it is possible to cause a heat accumulating agent (calcium chloride including water of crystallization or $CaCl_2.6H_2O$, for example) to undergo changes in phase by the heat released through the heat releasing end of the heat-pipes. This permits the heat accumulating agent to become solid when cooled and become liquid when heated to thereby accumulate heat in the form of latent heat. In a heating mode, the heat accumulator does not constitute a channel for the refrigerant and the refrigerant in the heat accumulator does not flow. Thus the heat released through the heat releasing end of the heat-pipes heats the heat accumulating agent to change same to a liquid state to accumulate heat. In a defrosting mode, the heat stored in the heat accumulator is released into the refrigerant flowing through the heat accumulator together with the heat directly released through the heat releasing end of the heat pipes. Release of heat from the heat accumulator is accompanied by a change in the phase of the heat accumulating agent, allowing a large amount of heat to be released into the refrigerant flowing in circulation. The refrigerant flowing through the heat accumulator is heated by the aforesaid action and evaporated to change into a gaseous state in which the refrigerant flows out and joins the dilute solution as aforesaid at the point of confluence. Thus the mixture of refrigerant and solution has its temperature raised and flows into the absorber, so that the amount of heat released in the absorber is increased to improve the heating performance of the system. The concentrated solution that has absorbed the refrigerant by the aforesaid absorbing action or a solution that has absorbed the refrigerant is returned to the generator by the solution pump.

DESCRIPTION OF THE PREFERRED EMBODIMENT

Figure 1:
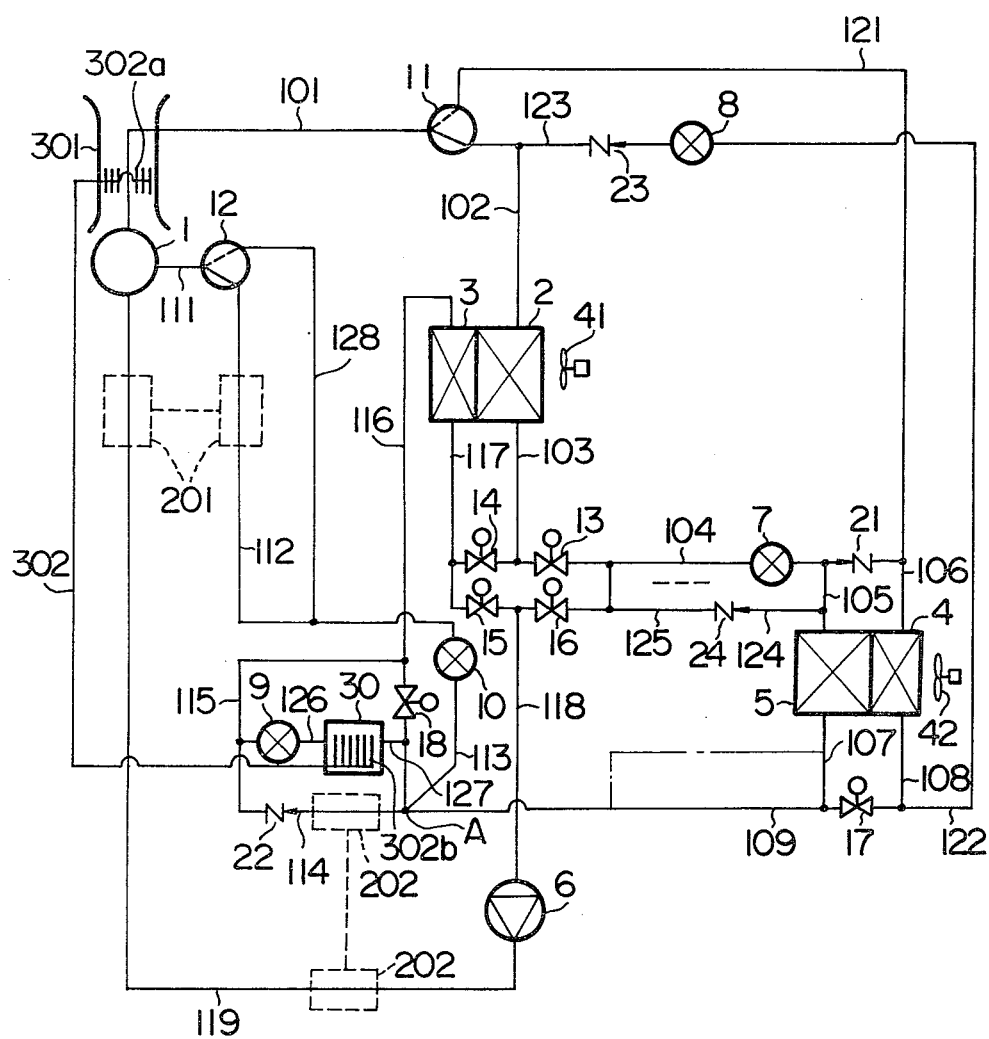
FIG. 1 is a systematic view of the refrigerating circuit of the absorption cooling and heating system comprising one embodiment of the invention.

FIG. 1 is a systematic view of the refrigerating circuit of the absorption cooling and heating system comprising one embodiment of the invention.

The cooling and heating system comprises a generator 1, a first outdoor heat exchanger 2, a second outdoor heat exchanger 3, a first indoor heat exchanger 4, a second indoor heat exchanger 5, a solution pump 6, an expansion valve 7 for cooling, an expansion valve 8 for heating, an expansion valve 9 for defrosting, a dilute solution pressure reducing valve 10, a first channel change-over valve 11, a second channel change-over valve 12, a first solenoid valve 13, a second solenoid valve 14, a third solenoid valve 15, a fourth solenoid valve 16, a fifth solenoid valve 17, a sixth solenoid valve 18, a first check valve 21, a second check valve 22, a third check valve 23, a fourth check valve 24 and an accumulator 30 are connected together as shown in FIG. 1. In a cooling mode, the first solenoid valve 13, third solenoid valve 15 and fifth solenoid valve 17 are opened, the second solenoid valve 14, fourth solenoid valve 16 and sixth solenoid valve 18 are closed, and the first and second channel control on-off valves 11 and 12 are actuated as indicated by solid lines to constitute the following circuit.

The generator 1 has a mixture of a refrigerant, such as freon 22, and an absorbing agent, such as tetraethyleneglycol dimethylether, contained therein and heated by a heat source, such as combustion gas. Heating of the generator 1 causes a refrigerant in a gaseous state of high temperature and high pressure to be separated from the absorbing agent in the form of a solution and generated. The refrigerant gas of high temperature and high pressure flows through a line 101 and a solid line channel of the first channel changeover valve 11, and flows into the first outdoor heat exchanger 2 through a line 102. The first outdoor heat exchanger 2 functions as a condenser where heat exchanger takes place between the refrigerant and outdoor air forcedly blown by a blower 41 against the heat exchanger 2 to release heat. The cooled refrigerant is changed into a liquid state. The liquid refrigerant of high pressure flows through a line 103 and the first solenoid valve 13 into the expansion valve 7 for cooling through a line 104. The liquid refrigerant tends to flow from the first solenoid valve 13 toward the fourth check valve 24 too but is prevented from flowing therethrough because the check valve 24 is constructed to check a flow in the indicated direction.

The refrigerant expanded by the expansion valve 7 for cooling and having its pressure reduced into a refrigerant gas of low pressure and low temperature flows in two parallel streams into the first indoor heat exchanger 4 and second indoor heat exchanger 5 through a line 105 and the first check valve 21 and a line 106 respectively. In the heat exchangers 4 and 5 functioning as evaporators, heat exchange takes place between the refrigerant gas of low temperature and low pressure and indoor air forcedly blown by a blower 42 against the heat exchangers 4 and 5 to cool the indoor air to effect space cooling. The refrigerant of low pressure tends to flow from the line 105 toward the fourth check valve 24 but is prevented from doing so because a high pressure is applied to the other end of the check valve 24. The gaseous refrigerant flowing out of the two indoor heat exchangers 4 and 5 flows in two streams through a line 107 and a line 108 and the fifth solenoid valve 17 to a line 109 where the two streams join each other and flows to a point of mixing A with a dilute solution.

Meanwhile a dilute solution of the absorbing agent containing a low concentration of refrigerant after separating the gaseous refrigerant at the generator 1 flows from the generator 1 through a line 111 and a solid line channel of the second channel change-over valve 12 and flows into the dilute solution pressure reducing valve 10 through a line 112, where it has its pressure reduced before flowing through a line 113 toward the point of confluence A by pressure differential. At the point of confluence A, the dilute solution is mixed with the refrigerant gas and the mixture flows through a line 114 and second check valve 22 into the second outdoor heat exchanger 3 through lines 115 and 116. In the second outdoor heat exchanger 3 functioning as an absorber, the fluid mixture is cooled by outdoor air blown by the blower 41 against the heat exchanger 3, so that the refrigerant is absorbed by the dilute solution containing an absorbing agent into a concentrated solution. The concentrated solution flows through a line 117, third solenoid valve 15 and a line 118 into the solution pump 6 which raises the pressure of the concentrated solution and feeds same through a line 119 into the generator 1, where a gaseous refrigerant is produced again and the aforesaid series of operations is repeated continuously to effect space cooling.

Another heat exchanger 201 is mounted by straddling the line 112 through which the dilute solution flows and the line 119 through which the concentrated solution flows as indicated by broken lines. The heat exchanger 201 is operative to impart the heat possessed by the dilute solution of high temperature to the concentrated solution about to flow into the generator 1, to thereby raise the temperature of the concentrated solution to enable economization to be achieved on the amount of heat required for heating the refrigerant in the generator 1.

Another heat exchanger 202 indicated by broken lines is also mounted in a manner to straddle the line 114 leading from the point of confluence A to the second check valve 22 and the line 119 through which the concentrated solution flows to effect heat exchange. The heat exchanger 202 is operative to heat the concentrated solution by effectively utilizing the heat of absorption by a mixture of refrigerant gas and dilute solution in a cooling mode, to thereby raise the temperature of the concentrated solution returning to the generator 1 to enable economization to be achieved on the amount of heat required for heating the refrigerant in the generator 1.

The two heat exchangers 201 and 202 are not essential and may be mounted when and where necessary.

The absorption type cooling and heating system of the aforesaid construction is provided with heat pipe means for recovering the waste heat of the burner for heating the generator 1. As shown, the generator 1 has connected thereto a flue 301 for waste heat having inserted therein a heat source end 302a of heat pipes 302 having a heat releasing end 302b opposite the heat source end 302a which is inserted in a heat accumulator 30 which is mounted between lines 126 and 127 connecting the defrosting expansion valve 9 to the point of confluence A between the dilute solution and the refrigerant gas so that the heat accumulator 30 itself constitute a fluid channel.

Figure 2:
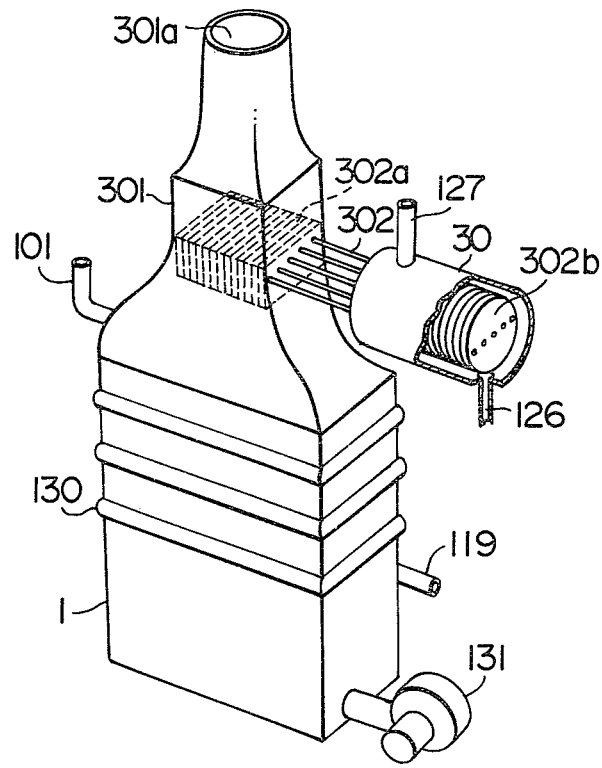
FIG. 2 is a perspective view of the generator and the heat accumulator with certain parts thereof being broken away, in explanation of the heat-pipe means.

FIG. 2 shows the detailed construction of the absorption type cooling and heating system. The generator 1 has a plurality of convolutions of a heat transfer tube 130 connected to the concentrated solution line 119 and wound around outer wall surfaces thereof and communicating with the interior thereof, although not shown. The generator 1 is heated at its lower portion by a burner, not shown to generate a gaseous refrigerant from the solution which is passed through line 101 to the first channel change-over valve 11. An upper portion of the generator 1 constitutes the flue 301 for waste heat open at an upper end 301a, and the lower portion thereof supports a blower 131 for producing a draft to discharge exhaust gases through the flue 301. The heat pipe 302 has its heat source end 302a inserted in the flue 301 and its heat releasing end 302b inserted in the heat accumulator 30 of the cylindrical shape connected through lines 126 and 127.

Figure 3:
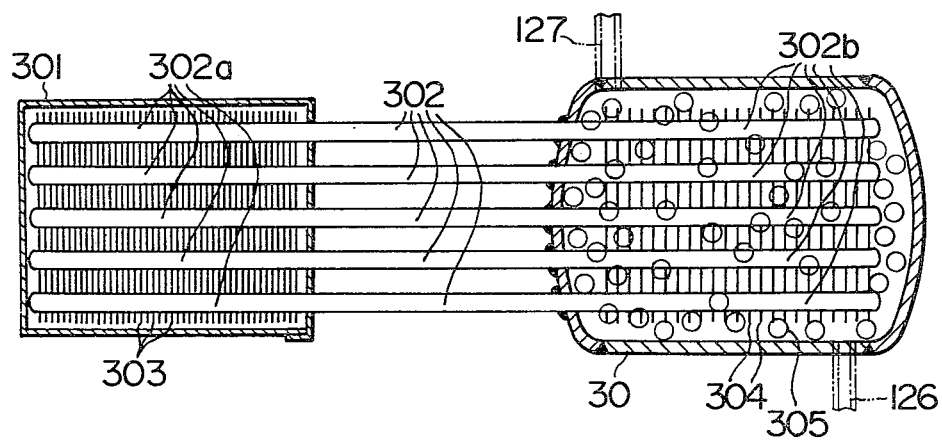
FIG. 3 is a detailed view, on an enlarged scale, of the heat pipe means shown in FIG. 2, showing the heat-pipe means located in a horizontal position in a transverse sectional view.

FIG. 3 shows the heat-pipes 302 in detail. The flue 301 has a multiplicity of fins 303 arranged vertically and the heat-pipes 302 penetrate the fins 303 at their forward ends to provide the heat source end 302a and extend at the other ends thereof into the cylindrical heat accumulator 30 having a multiplicity of circular fins 304 arranged in side-by-side relation and penetrated by the ends of the heat-pipes 302 to provide the heat releasing end 302b of the heat-pipes 302. The heat-pipes 302 have a working fluid, such as a freon, sealed therein, and a plurality of heat accumulating balls 305 are contained in the heat accumulator 30. The heat accumulating balls 305 each comprise a capsule formed of a synthetic resinous material and containing a heat accumulating agent, such as calcium chloride having a water of crystallization or $CaCl_2.6H_2O$, which has a property such that its phase undergoes a change to become solid when cooled and become liquid when heated. The heat accumulating balls 305 having a diameter greater than the diameters of the lines 126 and 127 connected to the heat accumulator 30 stay in the heat accumulator 30 at all times without flowing into the lines 126 and 127. With the heat accumulator 30 constituting a part of the channel for the refrigerant, the heat accumulating balls 305 float in the refrigerant in the heat accumulator 30.

Operation of the heat-pipe means of the aforesaid construction will be described. Exhaust gases flowing through the flue 301 of the generator 1 are exhaust gases of combustion for heating the solution in the generator 1 which have a high temperature of about 200° C. The heat of the exhaust gases is transferred through the fins 303 to the heat source end 302a of the heat-pipes 302 to cause the freon refrigerant in the heat-pipes 302 to vaporize. Meanwhile the heat releasing end 302b of the heat-pipes 302 in the heat accumulator 30 releases heat through the fins 304 into the refrigerant and the heat accumulating balls 305 in the heat accumulator 30 to cool the freon gas at the heat releasing end 302b of the heat-pipes 302. The cooled freon refrigerant at the heat releasing end flows to the heat source end 302a at which it absorbs heat from the exhaust gases again. Thus heat transfer takes place continuously. The heat accumulating balls 305 and the refrigerant in the heat accumulator 30 are heated as they absorb heat released through the heat releasing end 302b of the heat pipes 302, and the heat accumulating agent in the heat accumulating balls 305 changes into a liquid by heat to store the heat of fusion. The refrigerant in the accumulator 30 is vaporized upon being heated and stores heat.

The heat-pipe means operates as described hereinabove. The refrigerant channel through the heat accumulator 30 is not operative in a cooling mode, so that the heat stored in the heat accumulator 30 is not utilized. It is only in a defrosting mode that the heat accumulator 30 is rendered operative.

In a heating mode, the second solenoid valve 14, fourth solenoid valve 16 and sixth solenoid valve 18 are opened, the first solenoid valve 13, third solenoid valve 15 and fifth solenoid valve 17 are closed, and the first and second channel change-over valves 11 and 12 are switched to a broken line channel and a solid line channel respectively. The refrigerant gas of high temperature and high pressure generated in the generator 1 flows through line 101 and the broken line channel of the first channel change-over valve 11 into lines 121 and 106, before passing into the first indoor heat exchanger 4 which functions as a condenser to effect heat exchange between the refrigerant gas of high temperature and high pressure and indoor air forcedly blown by the blower 42 against the heat exchanger 4 to thereby release heat and heat the indoor air to effect space heating. The refrigerant gas of high temperature tends to flow from line 121 toward the first check valve 21. However, since the check valve 21 is constructed to block the flow in the indicated direction, no refrigerant flows to the check valve 21. The refrigerant in a liquid state of high pressure obtained by condensation at the first indoor heat exchanger 4 flows through lines 108 and 122 to the heating expansion valve 8 where it has its pressure reduced by expansion into a refrigerant of low temperature and low pressure which flows through the third check valve 23 and lines 123 and 102 into the first outdoor heat exchanger 2, from which it further flows through the line 103, second solenoid valve 14 and line 117 to the second outdoor heat exchanger 3. The two outdoor heat exchangers 2 and 3 function as evaporators, and heat exchange takes place between the refrigerant of low temperature and low pressure and outdoor air forcedly blown against the heat exchangers 2 and 3 by the blower 41, so that the refrigerant absorbs heat and evaporates. Then the refrigerant in a gaseous state of low pressure flowing out of the second outdoor heat exchanger 3 flows through the line 116 and sixth solenoid valve 18 to the point of confluence A at which it joins the dilute solution. The gaseous refrigerant tends to flow toward line 115 from line 116, too. However, the presence of the pressure reducing valve 9 and check valve 22 prevents the gaseous refrigerant from flowing toward line 115.

Meanwhile the dilute solution from which the refrigerant is separated in the generator 1 flows by pressure differential through the second channel change-over valve 12 and dilute solution pressure reducing valve 10 toward the point of confluence A, as is the case with a cooling mode, to join the gaseous refrigerant. The mixture of refrigerant and dilute solution flows through line 109 into the second indoor heat exchanger 5 where it performs an absorbing action. In the second indoor heat exchanger 5 functioning as an absorber, the heat of absorption is released into the indoor air forcedly blown by the blower 42 against the heat exchanger 5 to heat same while the mixture itself is cooled to absorb a refrigerant into the solution to change into a concentrated solution. Thus one of the two indoor heat exchangers functions as a condenser and the other heat exchanger functions as an absorber, so that both the heat of condensation and heat of absorption are utilized as a heat source to provide improved heating capacity. Then the solution flows through the line 124, fourth check valve 24, line 125, fourth solenoid valve 16 and line 118 to the solution pump 6. The concentrated solution flowing out of the second indoor heat exchanger 5 tends to flow toward line 105 too, but the solution is prevented from flowing in this direction because the expansion valve 7 is provided and the check valve 21 is sealed by high pressure gas at its end.

The concentrated solution has its pressure raised by the solution pump 6 and flows through line 119 to the generator 1 where a refrigerant in a gaseous state is generated again and the aforesaid series of operations is repeatedly performed to effect space heating.

The provision of the heat exchanger 201 shown in broken lines on the line 112 for the dilute solution to flow therethrough and the line 119 for the concentrated solution to flow therethrough enables the heat of the dilute solution of high temperature to be given to the concentrated solution flowing into the generator as is the case with a cooling mode, to thereby allow the amount of heat required for heating the generator 1 to be reduced.

Even if the heat exchanger 202 is mounted between the lines 114 and 119, the exchanger 202 does not operate in a heating mode because the channel through line 114 is not rendered operative.

The heat of exhaust gases in the flue 301 is stored through the heat-pipes 302 in the heat accumulator 30 in a heating mode in the same manner as described by referring to a cooling mode. However, the channel through the heat accumulator 30 is not operative in the heating mode, so that the stored heat is not used.

When space heating is carried out continuously over a prolonged period of time, frost formation takes place on the surfaces of the heat exchangers of the first and second outdoor heat exchangers 2 and 3 functioning as evaporators and interferes with vaporization of the refrigerant, thereby deteriorating the heating performance. Thus it is necessary to effect defrosting from time to time. During a heating operation, the system is switched to a defrosting operation in the event that frest formation on the outdoor heat exchangers is sensed as by checking a loss of power of the outdoor heat exchangers. In the defrosting mode, the first solenoid valve 13, third solenoid valve 15, fifth solenoid valve 17 and sixth solenoid valve 18 are closed, the second solenoid valve 14 and fourth solenoid valve 16 are opened, and the first and second channel change-over valves 11 and 12 are switched to a solid line channel and a broken line channel respectively.

The refrigerant gas of high temperature and high pressure generated in the generator 1 flows through line 101, the solid line channel of first channel change-over valve 11 and line 102 into the first outdoor heat exchanger 2. The blower 41 remains inoperative and the frost formed on the surface of the first outdoor heat exchanger 2 is efficiently melted by the refrigerant of high temperature flowing thereinto. The refrigerant of high temperature flows through the line 103, second solenoid valve 14 and line 117 into the second outdoor heat exchanger 3 to melt the frost formed on the surface of the heat exchanger in a defrosting operation. Thus the first and second outdoor heat exchangers 2 and 3 functioning as evaporators in a heating mode can have defrosting performed by utilizing the refrigerant of high temperature while at the same time space heating is being performed. Following defrosting, the refrigerant gas changes into a condensate which flows through lines 116 and 115 to the defrosting expansion valve 9 where it has its pressure reduced by expansion, before flowing through line 126 into the heat accumulator 30 which has heat accumulated therein by the heat accumulating action of the heat-pipe means in the heating mode. The refrigerant of low pressure flowing into the accumulator 30 is heated by the heat accumulated in the heat accumulator 30 and vaporizes into a heated refrigerant gas which flows through line 127 to the point of confluence A where it joins the dilute solution. In the heat accumulator 30, the heat accumulating agent in the heat accumulating balls 305 is in a liquid state to store heat therein, so that the heat accumulating agent releases heat into the refrigerant in circulation and changes into a solid state by the release of heat, to thereby generate heat as a result of the change in phase and heat the circulating refrigerant efficiently. The heat pipe means continuously performs the heating action or the action of absorbing heat by the heat source end 302a of the heat pipes 302 and releasing the heat through the heat releasing end 302b into the heat accumulator 30, so that the heat generated by the action of the heat pipes 302 is given to the refrigerant flowing through the heat accumulator 30. As a result, the refrigerant in circulation changes in its majority into a heated refrigerant gas. Meanwhile the dilute solution of high temperature separated from the refrigerant at the generator 1 flows through a broken line channel of the second channel change-over valve 12 and line 128 to the dilute solution pressure reducing valve 10 where it has its pressure reduced, before flowing through line 113 to the point of confluence A where it joins the heated refrigerant gas. The mixture of dilute refrigerant gas of high temperature and heated refrigerant gas is kept at high temperature and flows through lines 109 and 107 into the second indoor heat exchanger 5. The mixture of fluids of high temperature is cooled as it releases heat into a current of indoor air blown against the heat exchanger by the blower 42, so that the solution absorbs the refrigerant gas and changes into a concentrated solution. This absorbing action releases heat which heats the indoor air to effect space heating. Thus the second indoor heat exchanger 5 functions as an absorber to effect space heating while defrosting is being carried out on the outdoor heat exchangers 2 and 3. In this heating operation, the heat of absorption that is released is large in amount because the mixture of fluids of high temperature performs an absorbing action as aforesaid, thereby improving the heating coefficient of the system and enabling improved space heating to be effected.

The concentrated solution that has performed an absorbing action in the second indoor heat exchanger 5 flows through the line 124, fourth check valve 24, line 125, fourth solenoid valve 16 and line 118 to the solution pump 6 where it has its pressure raised before flowing through line 119 into the generator 1. In the generator 1, the concentrated solution generates a refrigerant gas again to perform the aforesaid series of operations continuously to effect defrosting while performing space heating at the same time. The concentrated solution flowing out of the second indoor heat exchanger 5 tends to flow toward the line 105 and check valve 21 too, but the concentrated solution is prevented from flowing through the check valve 21 because the lines 121 and 106 are filled with a refrigerant gas of high temperature. By mixing the low pressure refrigerant that has performed defrosting in a defrosting mode with a dilute solution as a heating refrigerant gas of high temperature and causing the mixture to flow into the second indoor heat exchanger 5 which is rendered to function as an absorber as aforesaid, it is possible to release a large amount of heat of absorption and heat of solution into the air in circulation and to utilize the heat of absorption as a heat source to improve the heating coefficient of the system. Thus space heating can be efficiently performed while at the same time defrosting is being carried out.

When defrosting of the first and second outdoor heat exchangers 2 and 3 is achieved by the aforesaid defrosting operation, the system is switched from the defrosting mode to a heating mode.

What is claimed is:

1. In an absorption cooling and heating system comprising:
 a generator;
 two outdoor heat exchangers;
 an expansion valve for cooling;
 an expansion valve for heating;
 an expansion valve for defrosting;
 two indoor heat exchangers;
 a pressure reducing valve for solutions;
 a solution pump; and
 a plurality of valves for switching between channels;
 wherein the first of said two outdoor heat exchangers functions as a condenser, said two indoor heat exchangers function as evaporators and the second outdoor heat exchanger functions as an absorber in a cooling mode, wherein said first indoor heat exchanger functions as a condenser, said two outdoor heat exchangers function as evaporators and said second indoor heat exchanger functions as an absorber in a heating mode, and wherein said two outdoor heat exchangers function as condensers and said second indoor heat exchanger functions as an absorber in a defrosting mode; the improvement comprising:
 a heat accumulator located downstream of the expansion valve for defrosting and serving as a channel for a refrigerant; and
 heat pipe means having a heat releasing end inserted in said heat accumulator and a heat source end inserted in a waste heat flue of a burner for heating said generator, whereby in a defrosting mode a refrigerant flowing from the condensers and having its pressure reduced by the expansion valve absorbs the waste heat of the burner for heating the generator through said heat accumulator, to be heated thereby and vaporize.

2. An absorption cooling and heating system as claimed in claim 1, wherein said heat-pipe means comprises a plurality of heat-pipes.

3. An absorption cooling and heating system as claimed in claim 1, wherein said heat-pipe means contains a refrigerant which may be freon.

4. An absorption cooling and heating system as claimed in claim 2, wherein said heat-pipes have at the heat source end a multiplicity of fins arranged in side-by-side relation inserted in the flue.

5. An absorption cooling and heating system as claimed in claim 2, wherein said heat-pipes have at the heat releasing end a multiplicity of fins arranged in side-by-side relation inserted in the heat accumulator.

6. An absorption cooling and heating system as claimed in claim 1, wherein said heat accumulator has connected thereto an inlet line and an outlet line of a channel for the refrigerant flowing in circulation through the absorption cooling and heating system.

7. An absorption cooling and heating system as claimed in claim 1, further comprising a plurality of heat accumulating balls sealed in said heat accumulator, said heat accumulating balls each containing a heat accumulating agent sealed in a capsule of synthetic resinous material and being in heat exchanging relation to the refrigerant flowing through said heat accumulator and the heat releasing end of said heat-pipe means.

8. An absorption cooling and heating system as claimed in claim 7, wherein said heat accumulating agent comprises $CaCl_2.6H_2O$.

* * * * *